United States Patent [19]

Adachi

[11] Patent Number: 5,953,324
[45] Date of Patent: Sep. 14, 1999

[54] CDMA MOBILE COMMUNICATION METHOD, SYSTEM AND MOBILE STATION APPARATUS

[75] Inventor: Fumiyuki Adachi, Yokohama, Japan

[73] Assignee: NTT Mobile Communications Network Inc., Tokyo, Japan

[21] Appl. No.: 08/776,554

[22] PCT Filed: May 30, 1996

[86] PCT No.: PCT/JP96/01460

§ 371 Date: Jan. 31, 1997

§ 102(e) Date: Jan. 31, 1997

[87] PCT Pub. No.: WO96/38999

PCT Pub. Date: Nov. 5, 1996

[30] Foreign Application Priority Data

May 31, 1995 [JP] Japan .................................. 7-134437

[51] Int. Cl.[6] .................................................. H04J 13/00
[52] U.S. Cl. .......................... 370/331; 370/332; 370/335; 370/333; 370/320; 371/30; 375/200; 375/206; 455/436; 455/439; 455/443; 455/444
[58] Field of Search .................................. 370/331, 310, 370/320, 332, 333, 335; 371/30; 375/200, 206; 455/439, 443.4, 436–442

[56] References Cited

U.S. PATENT DOCUMENTS

| | | | |
|---|---|---|---|
| 5,101,501 | 3/1992 | Gilhousen et al. | 455/33 |
| 5,313,489 | 5/1994 | Menich et al. | 375/1 |
| 5,347,535 | 9/1994 | Karasawa et al. | 375/1 |
| 5,420,850 | 5/1995 | Umeda et al. | 370/18 |
| 5,487,083 | 1/1996 | Nakajima et al. | 375/200 |
| 5,488,629 | 1/1996 | Takahashi et al. | 375/206 |
| 5,533,014 | 7/1996 | Willars et al. | 370/18 |
| 5,568,472 | 10/1996 | Umeda et al. | 370/18 |
| 5,673,260 | 9/1997 | Umeda et al. | 370/342 |
| 5,768,306 | 6/1998 | Sawahashi et al. | 375/206 |

FOREIGN PATENT DOCUMENTS

| | | |
|---|---|---|
| 4-502845 | 5/1992 | Japan . |
| 6-326652 | 11/1994 | Japan . |
| 70107007 | 4/1995 | Japan . |
| 94/29981 | 12/1994 | WIPO . |
| 95/01017 | 1/1995 | WIPO . |

*Primary Examiner*—William A. Cuchlinski, Jr.
*Assistant Examiner*—Yonel Beaulieu
*Attorney, Agent, or Firm*—Brown Raysman Millstein Felder & Steiner LLP

[57] ABSTRACT

A CDMA mobile communication system, which produces a time for monitoring peripheral base stations using different radio frequencies for carrying out hand-off between base stations using different radio frequencies without momentary cutoff of communication. A mobile station (504) of the CDMA mobile communication system discontinues error correction decoding on reception signal, outputs a user data which is not error correction decoded and, during the non-reception time in the blank time, changes over a reception frequency to a radio frequency of a neighboring base station monitor a reception level of the neighboring base station. During a hand-off period between a base station under communication (502) and a new base station (503) which differ in used frequency, the base station under communication and the new base station transmit only a user data portion, but do not transmit transmission signal in a transmission period for transmitting an error correction coding check bits. The mobile station (504) receives and demodulates the transmission signal of the base station under communication and, during an error correction coding check bit transmission period, changes over a frequency of a receiver to the frequency of the new base station to receive and demodulate the transmission signal of the new base station.

18 Claims, 14 Drawing Sheets

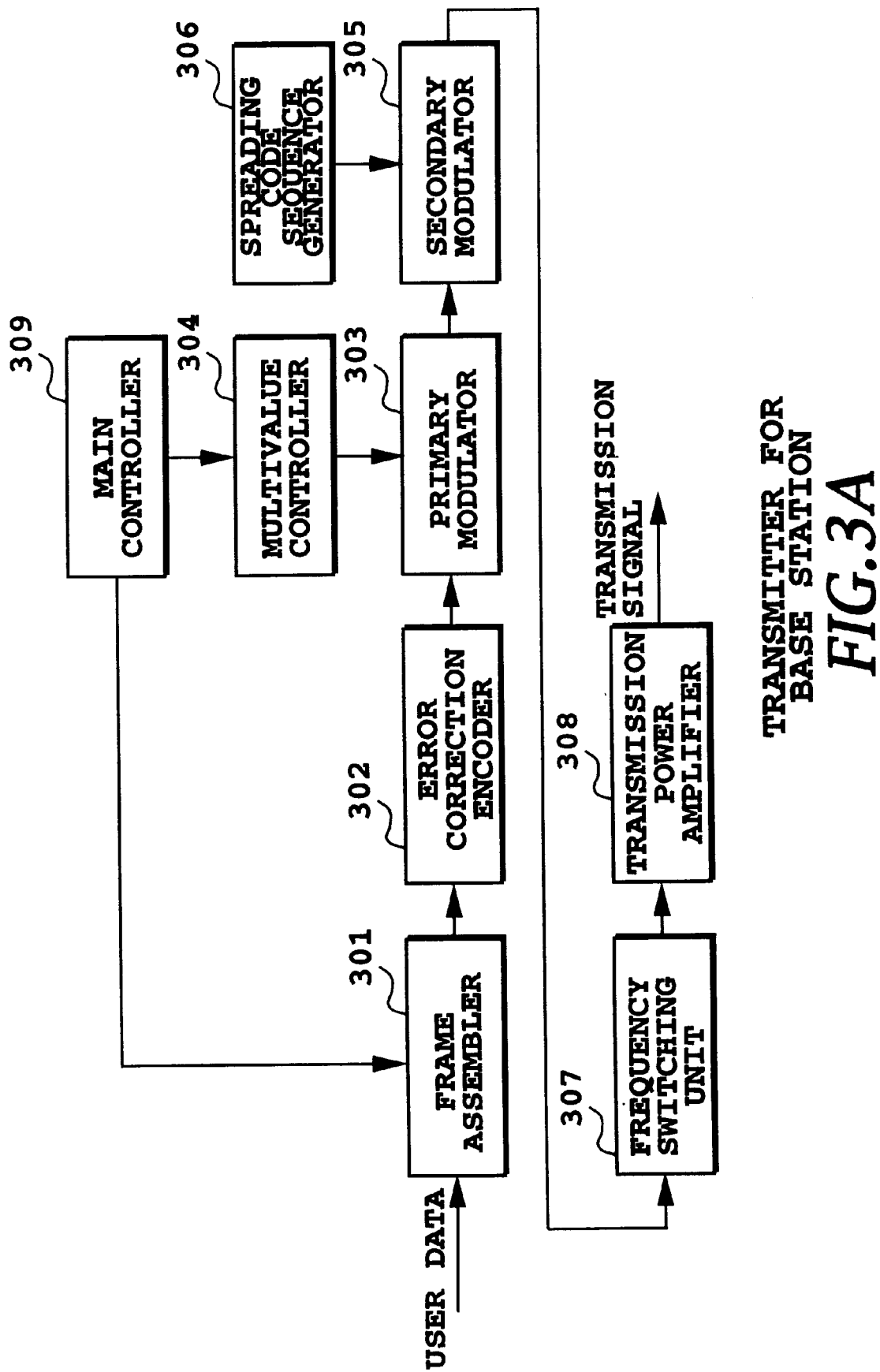
FIG. 3A TRANSMITTER FOR BASE STATION

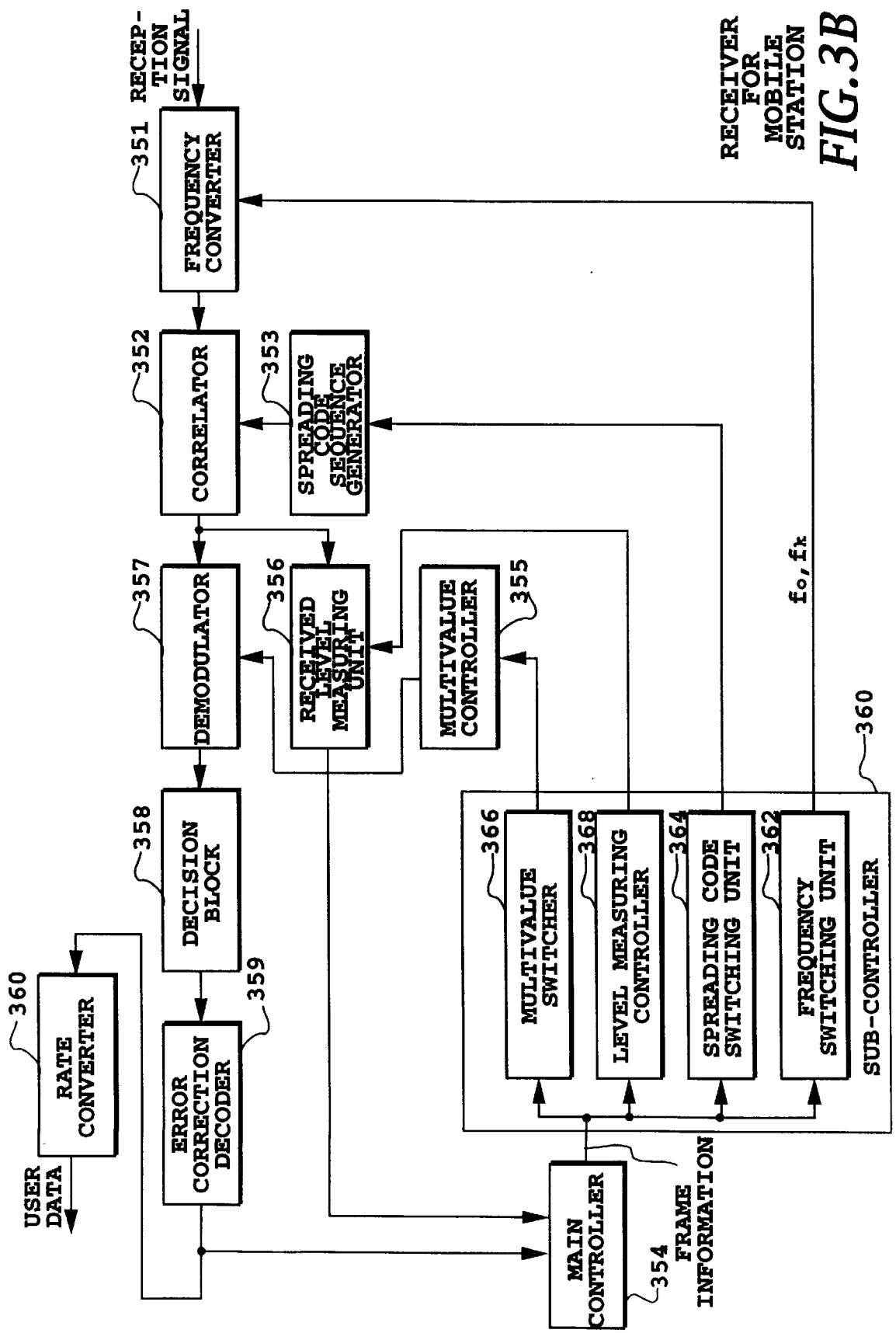
FIG. 3B RECEIVER FOR MOBILE STATION

FIG.6 TRANSMITTER FOR MOBILE STATION

CDMA MOBILE COMMUNICATION METHOD, SYSTEM AND MOBILE STATION APPARATUS

TECHNICAL FIELD

The present invention relates to reception level monitoring and hand-off operation in cellular mobile communications.

BACKGROUND ART

In cellular mobile communications, a number of base stations are disposed in a large service area. The base station to be connected is successively changed over as the mobile station moves so that the mobile station can make communication with a base station of the best communication quality to continue the communication. In this case, to search for a base station to be next connected, during communication radio waves of base stations around the base station under communication are received to measure the reception levels. From the measurement results, the mobile station determines a neighboring base station the highest reception level as the new base station to be next connected, and notifies the result to the base station in communication. Using this procedure, when change-over (hand-off) of the base station becomes required, an upper level station of the base station under communication instructs the base station under communication and the new base station to begin hand-off operation. During the hand-off operation, the same transmission data is transmitted from the base station under communication and the new base station, the mobile station changes over the transmission/reception frequency from the base station under communication to the new base station, or vice versa, in alternation. This is the method of monitoring neighboring base stations and hand-off in cellular mobile communications.

In a time division multiple access (TDMA) communication system, the transmission time is divided into short times called slots, and a number of mobile stations are assigned to different slots to make transmission and reception periodically. Therefore, the time other than the transmission and reception slot of the mobile station is a blank time. Making use of the blank time, the mobile station allows monitoring neighboring base stations to select a base station easily which provides the highest reception level. Thus, hand-off is made to the selected new base station (see "digital mobile telephone system" standard specifications, RCR STD-27B, by Research & Development Center for Radio System, or "Personal digital cellular telecommunication system RCR standard, RCR STD-27", Research & Development Center for Radio System).

On the other hand, in a code division multiple access (CDMA) communication system, though it has no blank time as seen in TDMA, since all of the base stations may use the same radio frequency, it is not necessary to make neighboring base station monitoring or changing over the transmission/reception frequency at hand-off operation (see R. Padovani, "Reverse link performance of IS-95 based cellular systems," IEEE Personal Communications, vol. 1, pp.28–34, 3rd Quarter 1994). That is, in CDMA, each base station spreads the transmission data to wideband signals using different spreading code sequence with a same frequency. Therefore, at the receiving side, it is sufficient to provide another correlator for despreading the received signal with the spreading code sequence of the peripheral base stations in order to achieve neighboring base station monitoring and hand-off operation.

However, also in CDMA, there is a case where base stations cannot use the same radio frequency. This is, for example, the case of a macrocell base station with a wide communication range which is overlaid by microcell base station with a narrow communication range. Since the transmission power of the microcell base station is smaller than that of the macrocell base station, if the same radio frequency is used, the transmission signal of the macrocell base station considerably affects the reception signal of the mobile station which is under communication with the microcell base station. Further, since the transmission power of the macrocell mobile station may be higher than the transmission power of a mobile station under communication with a microcell base station, the reception signal of the microcell base station is greatly interfered. To avoid such interference, it is necessary to use different radio frequencies between the microcell and macrocell base stations. In this case, the frequency is required to be changed over for neighboring base station monitoring and hand-off operation when change-over is made from the microcell base station to the macrocell base station or vice versa.

Since CDMA has no blank time as seen in TDMA, there is a method in which the transmission signal of the mobile station is received by neighboring base stations to detect the reception level, instead of making neighboring base station monitoring at the mobile station, to select a base station of the highest level as the new base station. In this method, each base station requires a receiver for level measurement, and an increasing number of level measurement receivers become required as the number of mobile stations under communication increases. Furthermore, large amounts of control processing will be required such as for level measurement and comparison. Yet further, at hand-off operation, the communication is momentarily cut off because the radio frequency is changed over.

DISCLOSURE OF THE INVENTION

With a view to solve the above problems, it is a primary object of the present invention to provide a transmission/reception method which, in CDMA mobile communications, has a blank time for measuring the reception signals from base stations using different radio frequencies, whereby signal levels from the neighboring base stations can be monitored in that time.

Another object of the present invention is to provide a transmission/reception method during hand-off operation which, in CDMA mobile communications, allows making a blank time during communication in order to carry out hand-off operation between base stations using different radio frequencies without instantaneous interception.

First, in accordance with the present invention, there is provided a CDMA mobile communication method, in which a first base station, after the user data is error correction encoded, transmits a narrow-band modulated signal obtained by primary modulation of the error correction coded user data, followed by secondary modulation by a spreading code to a wideband signal, and the mobile station makes conversion of the wideband signal to the narrow-band modulated signal, followed by demodulation and error correction decoding, to reproduce the user data; wherein the mobile station comprises the steps of:

demodulating the user data during a first time of receiving the user data transmitted from the first base station;

discontinuing the error correction decoding during a second time of receiving the error correction check bits and outputting the user data which are not error correction decoded; and changing over, in the second time, the reception frequency to a radio frequency of the second base station differing in used frequency from the first base station to monitor the reception level of the second base station.

In the CDMA mobile communication method, during the hand-off operation between the first base station and the second base station, the first base station may have a step for transmitting the user data in the first time and discontinuing the transmission in the second time, the second base station may have a step for transmitting the same user data in the second time and discontinuing the transmission in the first time, the mobile station may have a step for receiving and demodulating the signal from the first base station in the first time, changing over the frequency of the receiver to the radio frequency of the second base station in the second time to receive and demodulate the signal from the second base station, and recovering the user data by combining the signal from the first base station and the signal from the second base station.

In the CDMA mobile communication method, during the hand-off operation, the mobile station may be provided with a step for transmitting the user data to the first base station at a first radio frequency in a third time in which the user data is to be transmitted, and transmitting the same user data to the second base station at a second radio frequency in a fourth time in which the error correction check bits are to be transmitted, the first base station may be provided with a step for demodulating the user data received in the third time, the second base station may be provided with a step for demodulating the user data received in the fourth time, and a upper level station of the first base station and the second base station may be provided with a step for reproducing the user data by combining their demodulated signals.

In the CDMA mobile communication method, during the hand-off operation period between the first base station and the second base station, the first base station may have a step for transmitting the user data in the first time and discontinuing the transmission in the second time;

the second base station may have a step for transmitting the error correction check bits in the second time and discontinuing the transmission in the first time;

the mobile station may have a step for receiving and demodulating the signal from the first base station in the first time, changing over the frequency of the receiver to the radio frequency of the second base station in the second time to receive and demodulate the signal from the second base station, and reproducing the user data by using the user data transmitted from the first base station and error correction check bits transmitted from the second base station.

In the CDMA mobile communication method, during the hand-off operation,

The mobile station may have a step for transmitting the user data at the first radio frequency to the first base station in the third time in which the user data is to be transmitted, and transmitting the error correction check bits at the second radio frequency to the second base station in the fourth time in which the error correction check bits is to be transmitted;

the first base station may have a step for demodulating the user data received in the third time;

the second base station may have a step for demodulating the error correction check bits received in the fourth time; and the upper level station of the first base station and the second base station may have a step for reproducing the user data by error correction decoding using these demodulated signals.

Secondly, according to the present invention, there is provided a CDMA mobile communication method, in which a first base station, after the user data is error correction encoded, transmits a narrow-band modulated signal obtained by primary modulation with multivalue modulation of the user data and the error correction check bits, followed by secondary modulation by a spreading code to a wideband signal, and the mobile station makes conversion of the wideband signal to the narrow-band modulated signal, followed by demodulation and error correction decoding, to reproduce the user data; wherein during a reception level monitoring period for the mobile station to monitor the reception level of the signal from a second base station differing in frequency from the first base station:

the first base station comprises a step for making a second time for discontinuing transmission by transmitting the user data and the error correction check bits in the first time with an increased level of the multilevel modulation;

the mobile station comprises a step for demodulating the received signal with an increased level of the multilevel modulation and making error correction decoding to reproduce the user data in the first time, changing over the reception frequency to the radio frequency of the second base station to monitor the reception level of the second base station in the second time.

In the CDMA mobile communication method, during the hand-off operation period between the first base station and the second base station, the first base station may have a step for transmitting the user data and its error correction check bits in the first time;

the second base station may have a step for transmitting the user data and its error correction check bits in the second time;

the mobile station may have a step for receiving the user data and the error correction check bits from the first base station in the first time, changing over the reception frequency to the radio frequency of the second base station to receive the user data and the error correction check bits in the second time, and reproducing the user data by combining the signal from the first base station and the signal from the second base station.

Thirdly, according to the present invention, there is provided a CDMA mobile communication system, comprising a first base station which, after the user data is error correction encoded, transmits a narrow-band modulated signal obtained by primary modulation of the user data and the error correction check bits, followed by secondary modulation by a spreading code to a wideband signal, and a mobile station for making conversion of the wideband signal to the narrow-band modulated signal, followed by demodulation and error correction decoding, to reproduce the user data; wherein the mobile station comprises:

a demodulator for demodulating the user data in a first time of receiving the user data transmitted from the first base station;

an error correction decoder which discontinues the error correction decoding in the second time of receiving the error correction check bits and outputs the user data which are not error correction decoded;

frequency change-over means for changing over the reception frequency to a radio frequency of the second base station differing in used frequency from the first base station in the second time; and a received level measuring unit for monitoring the reception level of the signal from the second base station.

The CDMA mobile communication system may comprise an upper level station for instructing hand-off between the first base station and the second base station, wherein the first base station may comprise first control means for transmitting the user data in the first time and discontinuing the transmission in the second time according to the hand-off instruction from the upper level station;

the second base station may comprise second control means for transmitting the user data in the second time and discontinuing the transmission in the first time according to the hand-off instruction; and the mobile station may comprise receiving frequency switching means for tuning the frequency of a receiver to one of the transmission frequency of the first base station and the transmission frequency of the second base station, and a demodulator for receiving and demodulating the signal from the first base station in the first time and receiving and demodulating the signal from the second base station in the second time for combining the signal from the first base station and the signal from the second base station to reproduce the user data.

In the CDMA mobile communication system, the mobile station may comprise transmission frequency change-over means for changing over the transmission frequency of a transmitter between the reception frequency of the first base station and the reception frequency of the second base station, and transmission means for, during the hand-off period, transmitting user data at the reception frequency of the first base station in the third time in which the user data is to be transmitted and transmitting the user data at the reception frequency of the second base station in the fourth time in which the error correction check bits are to be transmitted;

the first base station may comprise a first demodulator for demodulating the user data received in the third time;

the second base station may comprise a second demodulator for demodulating the user data received in the fourth time; and the upper level station may comprise means for reproducing the user data by combining the demodulated signals demodulated by the first and second base station demodulators.

The CDMA mobile communication system may comprise a upper level station for instructing hand-off between the first base station and the second base station, and the first base station may comprise first control means for transmitting the user data in the first time and discontinuing the transmission in the second time according to the hand-off instruction from the upper level station;

the second base station may comprise second control means for transmitting the error correction check bits in the second time and discontinuing the transmission in the first time according to the hand-off instruction;

the mobile station may comprise receiving frequency switching means for changing the frequency of the receiver between the transmission frequency of the first base station and the transmission frequency of the second base station, and a demodulator for receiving and demodulating the signal from the first base station in the first time and receiving and demodulating the signal from the second base station in the second time to reproduce the user data using the user data from the first base station and the error correction check bits from the second base station.

In the CDMA mobile communication system, the mobile station may comprise transmission frequency change-over means for changing over the transmission frequency of a transmitter between the reception frequency of the first base station and the reception frequency of the second base station, and transmission means for, during the hand-off period, transmitting user data at the reception frequency of the first base station in the third time in which the user data is to be transmitted and transmitting the error correction check bits at the reception frequency of the second base station in the fourth time in which the error correction check bits are to be transmitted;

the first base station may comprise a demodulator for demodulating the user data received in the third time;

the second base station may comprise a demodulator for demodulating the error correction check bits received in the fourth time; and the upper level station may comprise means for making error correction decoding using the demodulated signals outputted from the individual demodulators to reproduce the user data.

Fourthly, according to the present invention, there is provided a CDMA mobile communication system, comprising a first base station which, after the user data is error correction encoded, transmits a narrow-band modulated signal obtained by primary modulation with multilevel modulation of the user data and the error correction check bits, followed by secondary modulation by the spreading code to a wideband signal, and a mobile station for making conversion of the wideband signal to the narrow-band modulated signal, followed by demodulation and error correction decoding, to reproduce the user data; wherein the first base station comprises a first modulation level control unit for varying the level of the multilevel modulation of the user data and the error correction check bits, and means for making a second time for discontinuing transmission by transmitting with an increased modulation level in the first time during a reception level monitoring period for the mobile station to monitor the reception level of the signal from a second base station differing in frequency from the first base station; and the mobile station comprises receiving frequency switching means for changing the frequency of the receiver between the transmission frequency of the first base station and the transmission frequency of the second base station, a second modulation level control unit for changing the level of the multilevel modulation, and a demodulator for demodulating the reception signal with an increased modulation level and making error correction decoding to reproduce the user data, and a received level measuring unit for changing over the reception frequency to the transmission frequency of the second base station to monitor the reception level of the second base station.

The CDMA mobile communication system may comprise a upper level station for instructing hand-off between the first base station and the second base station, and the first base station may comprise first transmission means for transmitting the user data and its error correction check bits in the first time according to the hand-off instruction from the upper level station; and wherein the second base station may comprise second transmission means for transmitting the user data and its error correction check bits in the second time according to the hand-off instruction; and the mobile station may comprise means for receiving the user data and the error correction check bits from the first base station in the first time, changing over the reception frequency to the transmission frequency of the second base station in the second time to receive the user data and the error correction check bits, combining the signal from the first base station and the signal from the second base station, and error correction decoding to reproduce the user data.

Fifthly, according to the present invention, there is provided a CDMA mobile communication system, comprising a first base station which, after the user data is error correction encoded, transmits a narrow-band modulated signal obtained by primary modulation of the user data and the error correction check bits, followed by secondary modulation by a spreading code to a wideband signal, and a mobile station for making conversion of the wideband signal to the narrow-band modulated signal, followed by demodulation and error correction decoding, to reproduce the user data; wherein a receiver of the mobile station comprises:

a demodulator for demodulating the user data in a first time of receiving the user data transmitted from the first base station;

an error correction decoder which discontinues the error correction decoding in the second time of receiving the error correction check bits and outputs the user data which are not error correction decoded;

a frequency switching unit for changing over the reception frequency to a radio frequency of the second base station differing in used frequency from the first base station in the second time; and a received level measuring unit for monitoring the reception level of the second base station.

Alternatively, in the mobile station, the receiver of the mobile station may comprise:

a reception frequency switching unit for changing the reception frequency of the receiver between the transmission frequency of the first base station and the transmission frequency of the second base station, and a demodulator which, during the hand-off period between the first base station and the second base station, receives and demodulates the signal from the first base station in the first time, receives and demodulates the signal from the second base station in the second time for combining the signal from the first base station and the signal from the second base station to reproduce the user data;

and the transmitter of the mobile station may comprise:

transmission frequency change-over means for changing the transmission frequency between the reception frequency of the first base station and the reception frequency of the second base station; and transmission means for, during the hand-off period, transmitting user data at the reception frequency of the first base station in the third time in which the user data is to be transmitted and transmitting the user data at the reception frequency of the second base station in the fourth time in which the error correction check bits are to be transmitted; and wherein the first base station may have a step for demodulating the user data received in the third time;

the second base station may have a step for demodulating the user data received in the fourth time; and a upper level station of the first base station and the second base station may have a step for combining these demodulated signals to reproduce the user data.

Sixthly, according to the present invention, there is provided a mobile station in CDMA mobile system, comprising a first base station which, after a user data is error correction encoded, transmits a narrow-band modulated signal obtained by primary modulation with multilevel modulation of the user data and the error correction check bits, followed by secondary modulation by the spreading code to a wideband signal, and a mobile station for making conversion of the wideband signal to the narrow-band modulated signal, followed by demodulation and error correction decoding, to reproduce the user data, the first base station transmits the user data and the error correction check bits in a first time with an increased level of the multilevel modulation to make a second time for discontinuing transmission, wherein a receiver of the mobile station comprises:

a modulation level controller for increasing the level of the multilevel modulation in the first time during reception level monitoring period for monitoring the reception level of the signal from a second base station differing from the first base station;

means for reproducing said user data which, during the first time, demodulates said user data and error correction check bits, and error correction decodes said user data.

a reception frequency switching unit for tuning the reception frequency of the receiver to one of the transmission frequency of the first base station and the transmission frequency of the second base station; and a received level measuring unit for monitoring the reception level of the second base station in the second time.

In the mobile station, the reception frequency switching unit of the receive of the mobile station may, during the hand-off period between the first base station and the second base station, changes over the reception frequency to the transmission frequency of the first base station in the first time, and to the transmission frequency of the second base station in the second time, and the reproduction means may combine the signal from the first base station and the signal from the second base station to reproduce the user data.

With the present invention, in CDMA mobile communications, since the mobile station is able to make a blank time for measuring the signal level from a base station using a different radio frequency, the mobile station can monitor the base station in that time.

Still further, in hand-off operation between base stations using different radio frequencies in CDMA communications, since, during the hand-off period of the base station and the mobile station, signals of both base stations can be received and the same transmission data can be transmitted to both base stations, occurrence of instantaneous interception in communication can be prevented during hand-off period.

BRIEF DESCRIPTION OF THE DRAWINGS

FIGS. 3A and 3B are block diagrams showing a second embodiment of a transmitter of a base station and a receiver of a mobile station of the CDMA mobile communication system in accordance with the present invention;

BEST MODE FOR CARRYING OUT THE INVENTION

Embodiments of the present invention will now be described with reference to the accompanying drawings.

EMBODIMENT 1

Figure 1A:
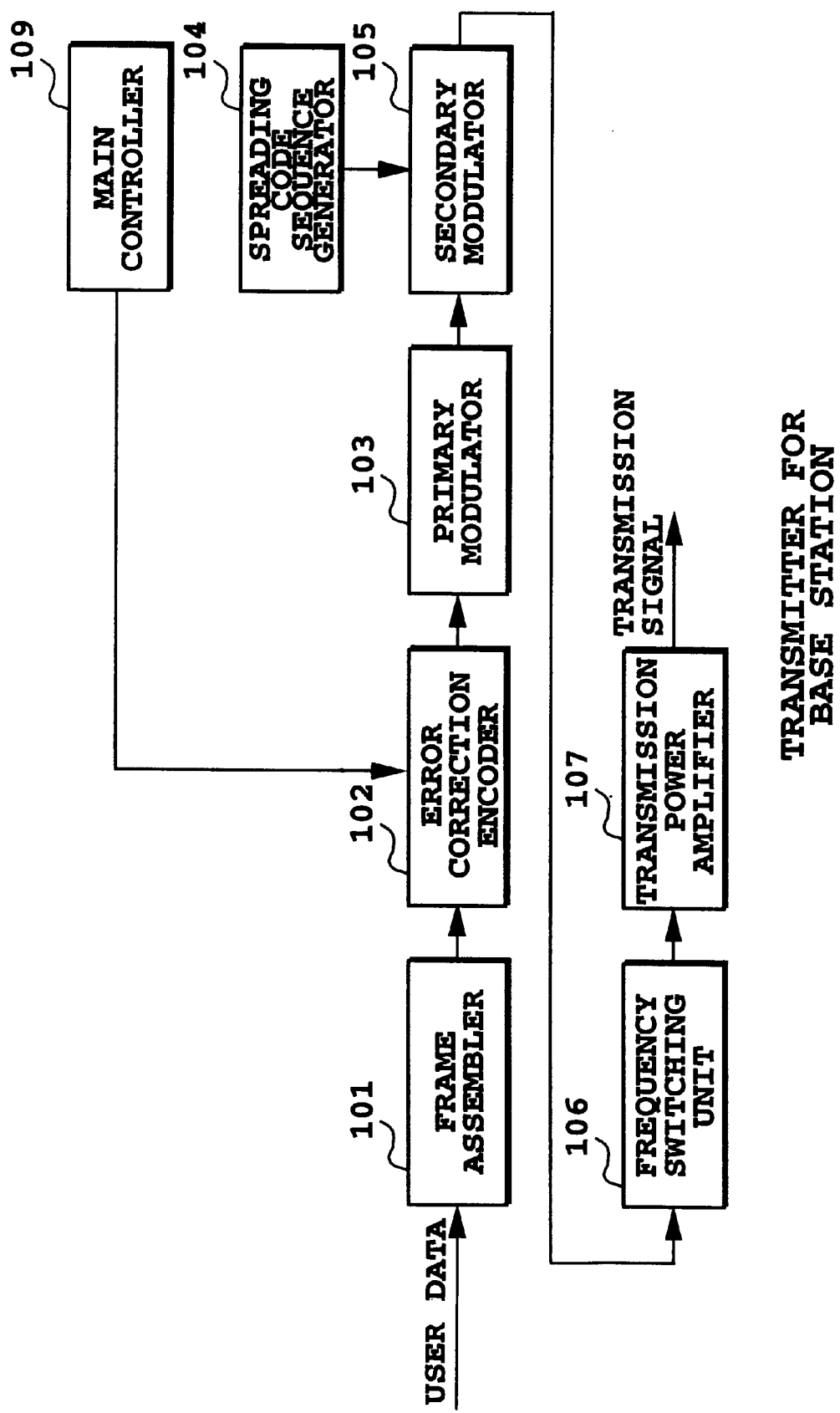
FIGS. 1A and 1B are block diagrams showing a first embodiment of a transmitter of a base station and a receiver of a mobile station of the CDMA mobile communication system in accordance with the present invention.
Figure 1B:
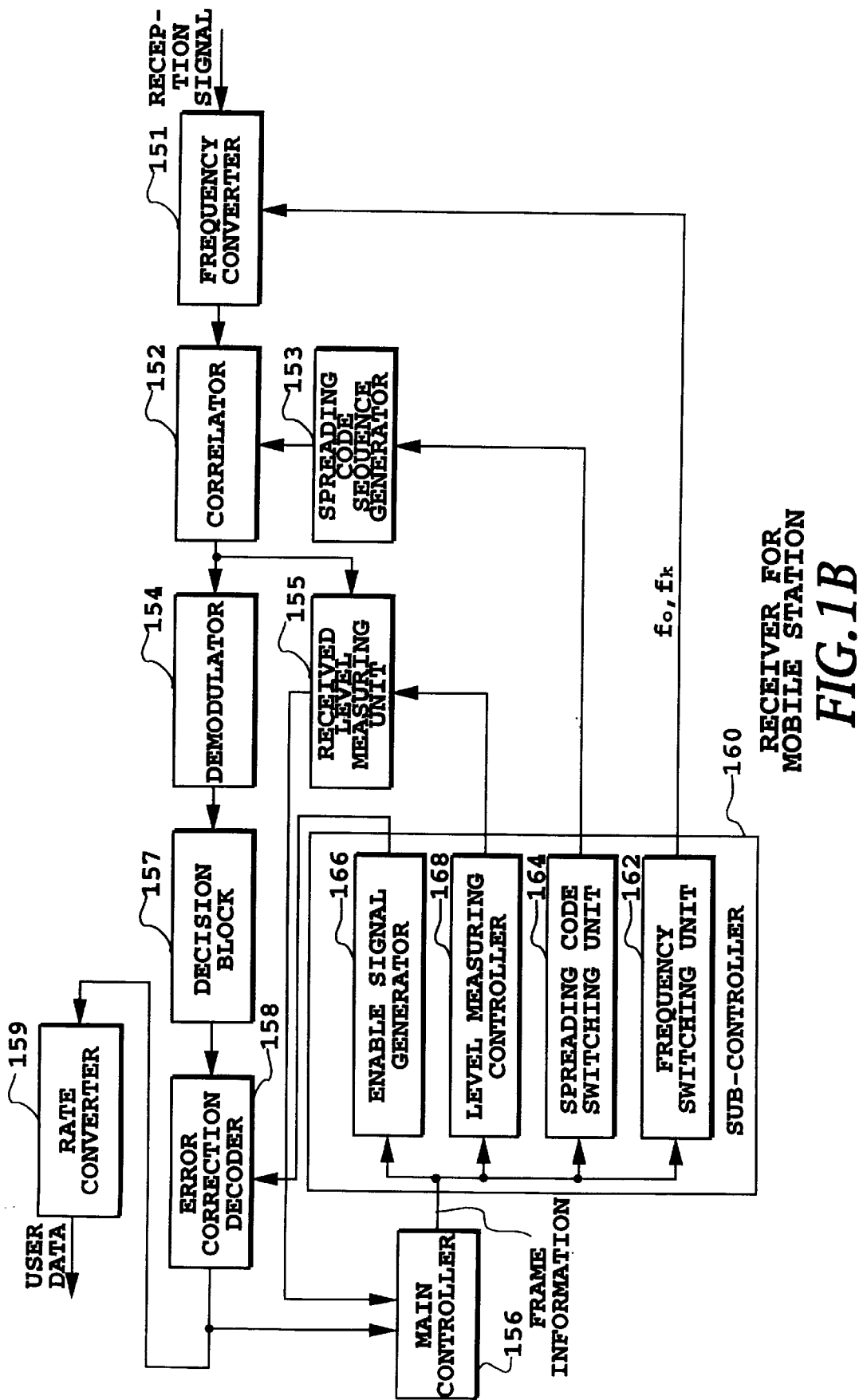
Figure 2:
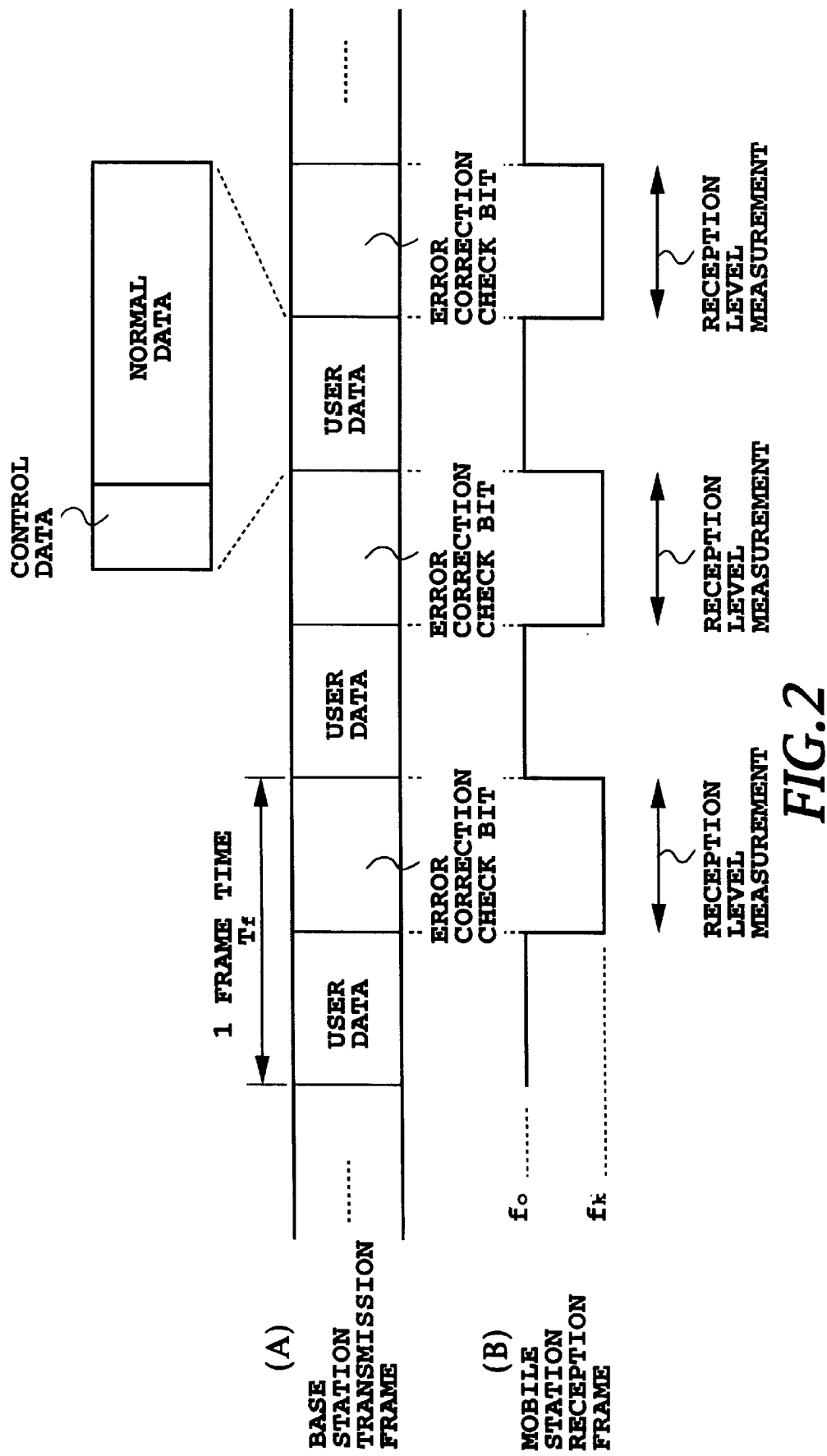
FIG. 2 is a timing chart of reception level measurement in the mobile station in the first embodiment.

FIGS. 1A and 1B are block diagrams showing a first embodiment of a transmitter of a base station and a receiver of a mobile station of the CDMA mobile communication system in accordance with the present invention, FIG. 2 shows a frame structure and reception timing used in the present invention;

Referring to FIG. 1A, the reference numeral 101 indicates a frame assembler for framing the input data, 102 is a error correction encoder for making error correction coding the framed data, and 103 is a primary modulator for making phase modulation of the output of the error correction encoder 102. The numeral 105 indicates a secondary modulator for spreading the primary modulated signal with a spreading code produced by a spreading code sequence 104. 106 is a frequency converter for converting the spread signal to a transmission frequency. 107 is a transmission power amplifier for making power amplification. 109 is a main controller for controlling the above-described individual units.

In FIG. 1B, 151 is a frequency converter for converting the reception signal to a baseband, 152 is a correlator for despreading the baseband signal with a spreading code generated by a spreading code sequence generator 153. The despread signal is demodulated by a demodulator 154, and reverted back to the original signal by a decision block 157. 158 is an error correction decoder, by which the reverted signal is error corrected. 159 is a rate converter, by which the signal is converted to the complete original signal of the original code rate. 155 is a received level measuring unit, 156 is a main controller, and 160 is a sub-controller. The main controller 156 controls various units of the above-described receiver. The main controller 156 is inputted with control information extracted from frame data supplied from the error correction decoder 158. The sub-controller 160 is controlled by the main controller 156.

The sub-controller 160 comprises a frequency switching unit 162, a spreading code switching unit 164, an enable signal generator 166, and a level measuring controller 168, whereby controlling change-over of reception frequency, change-over of spreading code, execution/pausing of error correction decoding, and timing of reception level measurement.

Operation of the transmission unit of the base station shown in FIG. 1A will be described. The user data sequence in the base station is first arranged by the frame assembler 101 to data of each predetermined one frame time (Tf). Transmission data of 1 frame is error correction encoded by the error correction encoder 102, disposing the transmission data sequence and error correction check bit sequence as shown in FIG. 2. To this signal, for example, quadrature phase modulation is carried out by the primary modulator 103. After that, the quadrature phase modulated signal is band spread (secondary modulated) by the secondary modulator 105 to a wideband signal using a spreading code sequence from a spreading code sequence generating unit 104. The wideband signal is frequency converted by the frequency converter 106 to a radio frequency, and power amplified by the transmission power amplifier 107 to be transmitted.

In the receiver of the mobile station shown in FIG. 1B, first the frequency converter 151 converts the reception signal to baseband signal. Then, the correlator 152 correlates (despread) the spreading code sequence with the reception signal to obtain a quadrature phase modulated signal. The spreading code sequence is the same code as used in transmission from the base station, which is generated by a spreading code sequence generator 153. Then, the signal is demodulated by the demodulator 154, and decision on the transmitted encoded data is made by the decision block 157. In normal communication (normal mode), detected data is error corrected by the error correction decoder 158, and rate converted by the rate converter 159 to reproduce the data transmitted from the base station.

In a neighboring base station monitoring mode, on the other hand, the mobile station, as shown in FIG. 2(A), receives only the user data sequence portion of the frame by the function of the subcontroller 160. This control is made as shown below. First, the main controller 156 detects data length of the user data from the control data of each frame head portion of the reception signal, and supplies the information to the sub-controller 160. According to the information, the enable signal generator 166 of the sub-controller 160 discontinues error correction by the error correction decoder 158 during the error correction check bit period. Further, during this period, the level measuring controller 168 of the sub-controller 160 sends a signal to the received level measuring unit 155 to instruct reception level measurement. Still further, the frequency switching unit 162 sends a signal to the frequency converter 151 to cause the frequency of the receiver to be changed over to the frequency of the neighboring base station.

FIG. 2(B) shows the receiving frequency switching timing of this time, which uses an error correction code with an coding rate of about ½ to enhance the error correction capability (therefore, the user data length is about the same as the check bit length). In FIG. 2(A), fo is a radio frequency of a base station under communication, fk is a radio frequency of a counterpart base station to be reception level measured. It is shown that during the error correction check bit period, the reception frequency is changed over to measure the reception level of a neighboring base station frequency fk. This allows neighboring base station monitoring without discontinuing the communication.

As described above, error correction decoding is not made during the level monitoring period in the present invention. Therefore, deterioration of reliability can be relaxed to some extent by increasing the transmission power of the transmission data sequence portion at the base station.

EMBODIMENT 2

Figure 4:
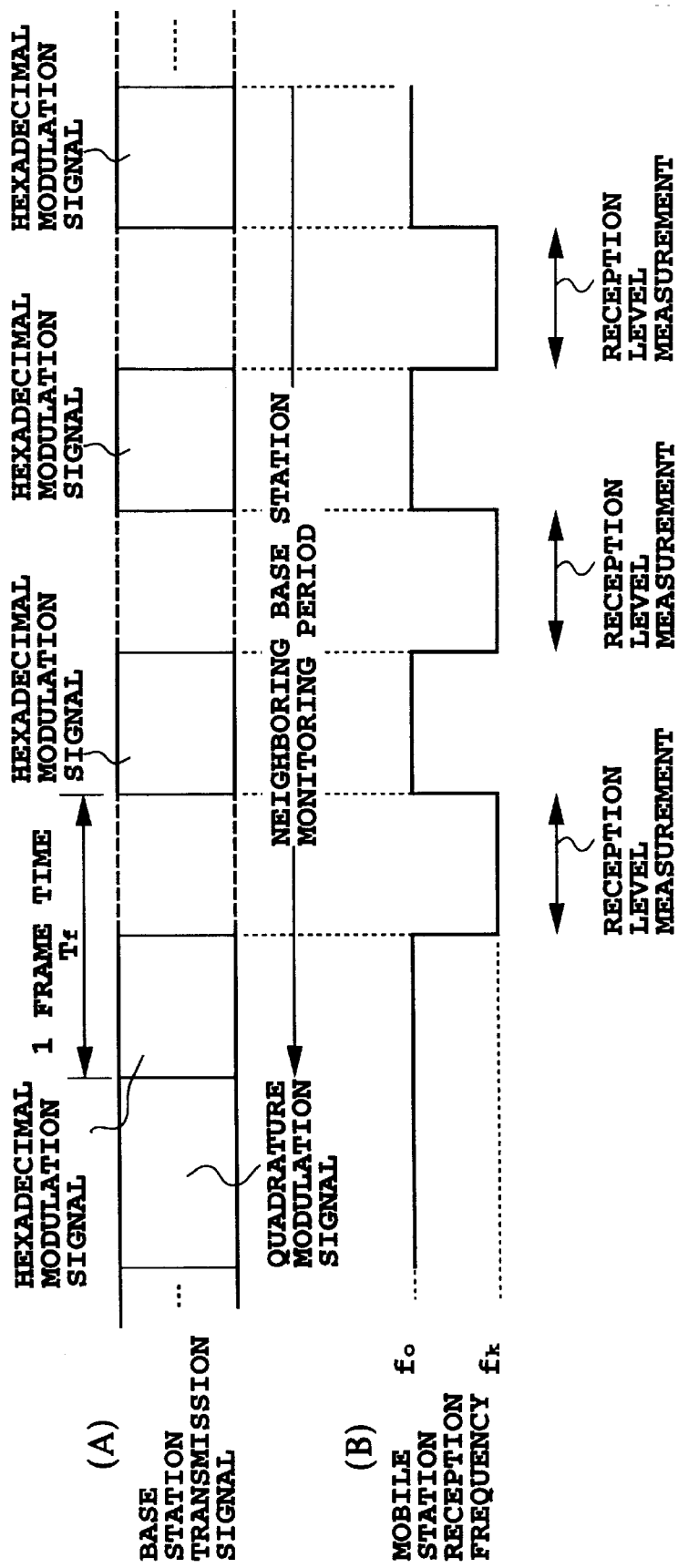
FIG. 4 is a timing chart of reception level measurement in the mobile station in the second embodiment.

FIG. 3 shows another embodiment according to the present invention. FIGS. 3A and 3B are block diagrams showing a second embodiment of a construction of the CDMA mobile communication system in accordance with the present invention. FIG. 3A shows construction of a transmitter of a base station, and FIG. 3B shows construction of a receiver of a mobile station. FIG. 4 shows frame configuration and reception timing used in the present invention.

A difference of the transmitter of the base station of FIG. 3A from the transmitter of the base station shown in FIG. 1A is that the former has a modulation level controller 304, whereby a primary control unit 303 is controlled, for example, from quadrature phase modulation to hexadecimal phase modulation, to enable changeable modulation level.

Further, a difference of the receiver of the mobile station of FIG. 3B from the receiver of the base station shown in FIG. 1B is that the former has a demodulation level controller 355, whereby a demodulator 357 is controlled.

With this construction, in a normal mode, the base station makes 4-level quadrature amplitude modulation of the transmission signal to be transmitted. However, in a neighboring base station monitoring mode, it makes 16-level quadrature amplitude modulation, for example. One of four modulation states is represented by two bits in the former, whereas one of 16 modulation states can be represented by 4 bits in the latter. Therefore, 16 level modulated signal transmitted during reception signal level measurement in the mobile station exists for a half time of frame as shown in FIG. 4(A), and the remnant is a blank time where no modulated signal is present. That is, a blank time occurs in transmission.

By this method, the frequency of the receiver can be changed over in the blank time without discontinuing communication at the mobile station, as shown in FIG. 4(B), to measure the reception level of a neighboring base station of frequency fk.

Further, in the monitoring mode period, the transmission power of the base station can be increased to relax deterioration in reliability associated with increasing the modulation level.

EMBODIMENT 3

In the case of making level monitoring as described in FIGS. 1A and 1B and FIG. 2, hand-off for changing over the base station during communication by using a similar apparatus will be described with reference to FIG. 5 to FIG. 8.

Figure 5:
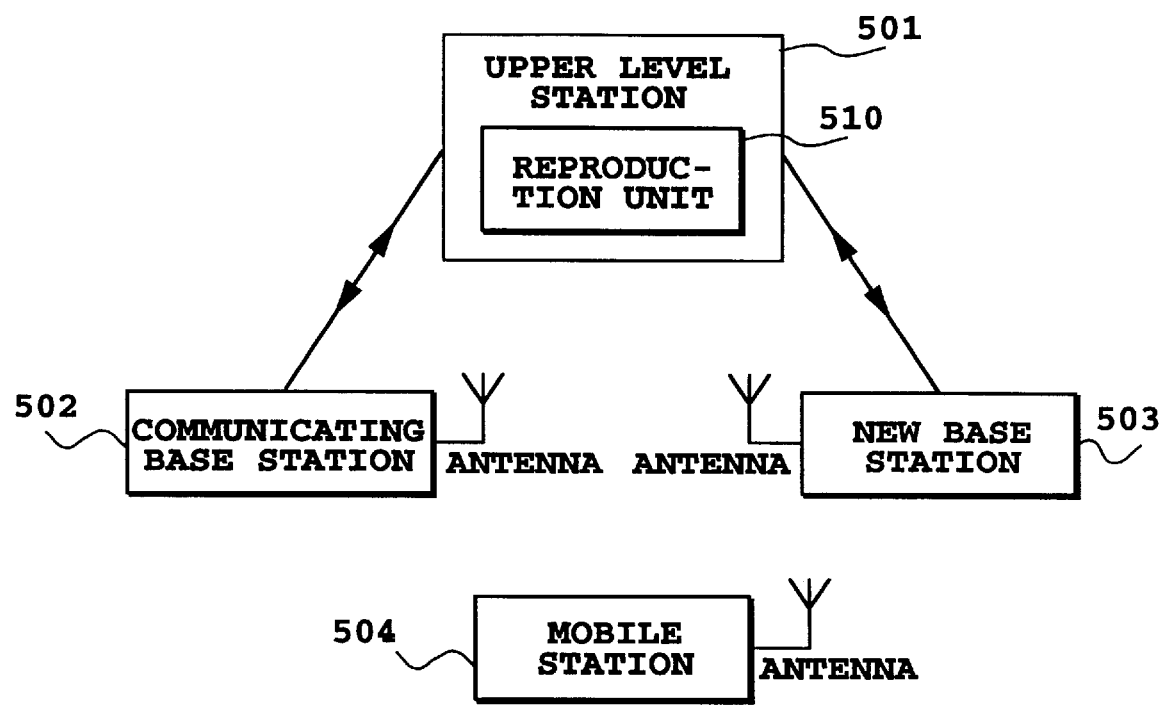
FIG. 5 is a block diagram showing the system construction in making hand-off in third to fifth embodiments of the CDMA mobile communication system in accordance with the present invention.

A system configuration for hand-off is shown in FIG. 5. A mobile station 504 is under communication with a communicating base station 502. As a result of measurement, a new base station 503 is better in measurement result, and it becomes necessary to hand off to the new base station 503. In this case, hand-off is made under control of a upper level station 501 of the communicating base station 502 and the new base station 503.

Figure 6:
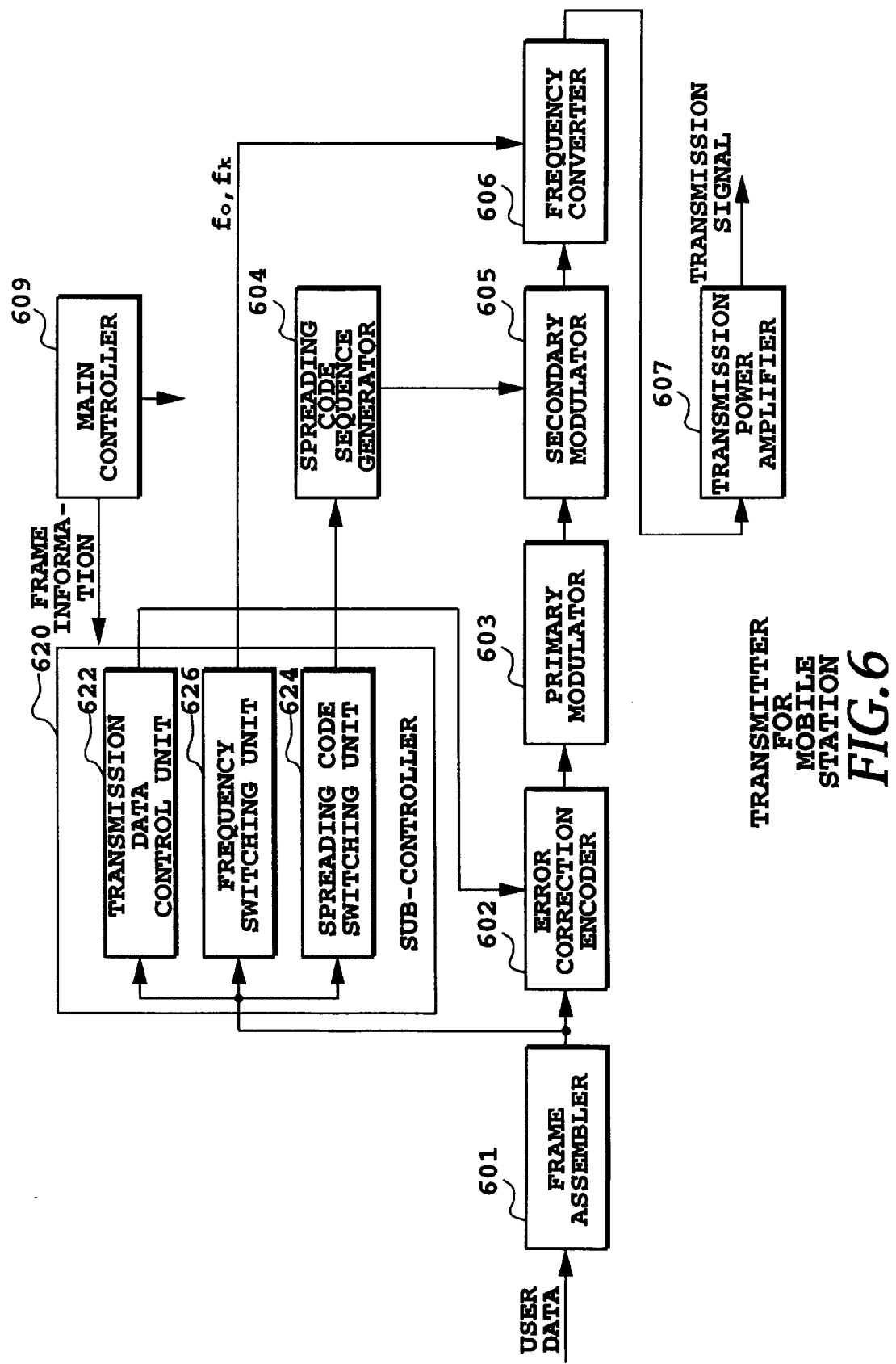
FIG. 6 is a block diagram showing a transmitter of the mobile station of the third embodiment of the CDMA mobile communication system in accordance with the present invention.

FIG. 6 is a block diagram showing construction of a transmission unit of the mobile station 504. In this figure, symbol 60X (X=1–7.9) corresponds to symbol 10X in FIG. 1A.

A difference of this transmission unit from the transmission unit of the base station shown in FIG. 1A is that the former has a sub-controller 620. The sub-controller 620 comprises a transmission data control unit 622, a spreading code switching unit 624, and a frequency switching unit 626, which individually supplied with control information from a main controller 609. The transmission control unit 622 sends a signal to the error correction encoder 602 to control so that the user data is repeatedly outputted two times during the period of 1 frame, as shown in FIG. 8(A). Of these two times repeated data, the first data is transmitted to the communicating base station 502, and the next data is transmitted to the new base station 503. According to this, the spreading code switching unit 624 sends a signal to a spreading code sequence generating unit 604 to change over the spreading code, and the frequency switching unit 626 sends a signal to the frequency converter 606 to change over the output frequency.

The transmission unit of the base station and the reception unit of the mobile station are similar in construction to the transmission unit and the reception unit as shown in FIGS. 1A and 1B. Further, the reception unit of the base station is similar in construction to the reception unit of the mobile station as shown in FIG. 1B, with the frequency switching unit 162 and the spreading code switching unit 164 removed.

Figure 7:
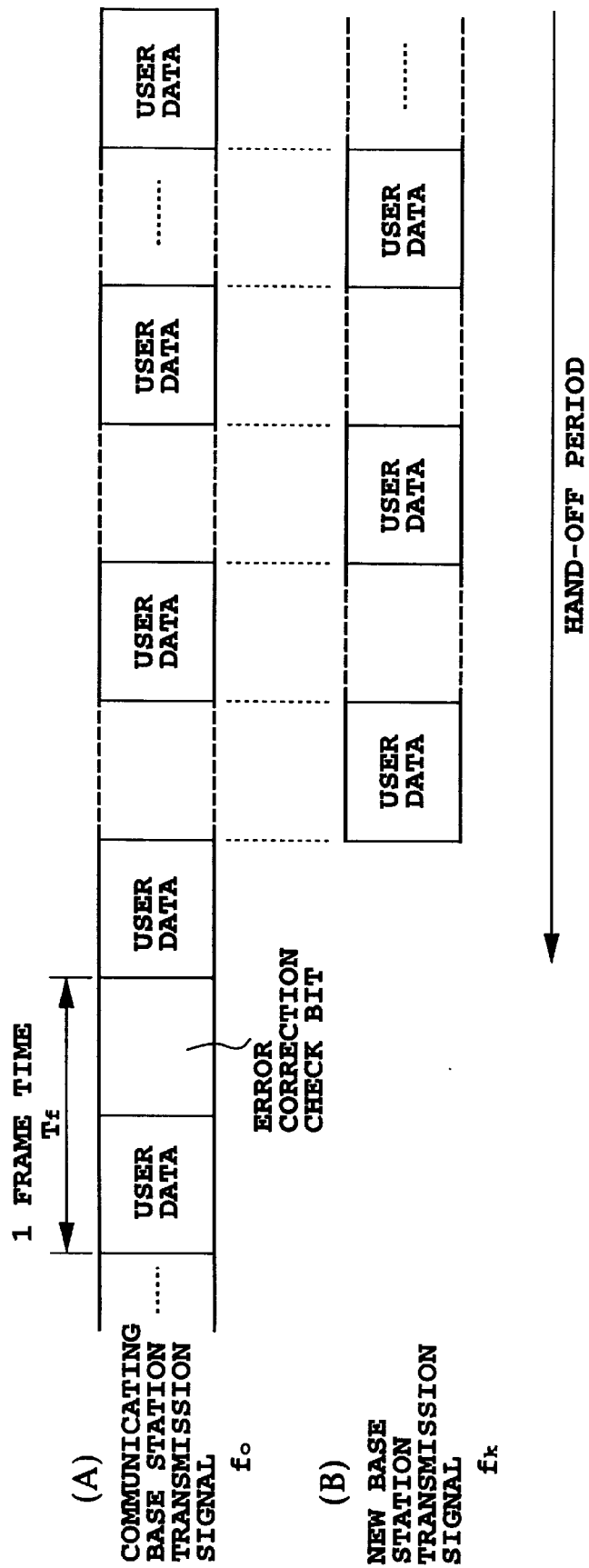
FIG. 7 is a timing chart showing operation of the base station during hand-off operation in the third embodiment.

FIG. 7 shows transmission signals of the base station 502 under communication and the new base station 503 during the hand-off period. During the hand-off period, under the control of the upper level station 501, in the two base stations 502 and 503 making hand-off operation, error correction code is not produced, but only the user data sequence portion is modulated to make communication from both the communicating base station 502 and the new base station 503. Specifically, the main controller 109 (FIG. 1A) of each base station enables or disables the error correction encoder 102 according to the instruction from the upper level station 501 to transmit the user data in the timing as shown in FIG. 7.

On the other hand, in the mobile station 504, the reception frequency is changed over in the course of the frame to receive and demodulate the transmission signals from the communicating base station 502 and the new base station 503. The two signals received during the period of the change-over are stored in a memory (not shown) which are read and combined to make decision. This reproduces reliable user data even at the change-over.

Figure 8:
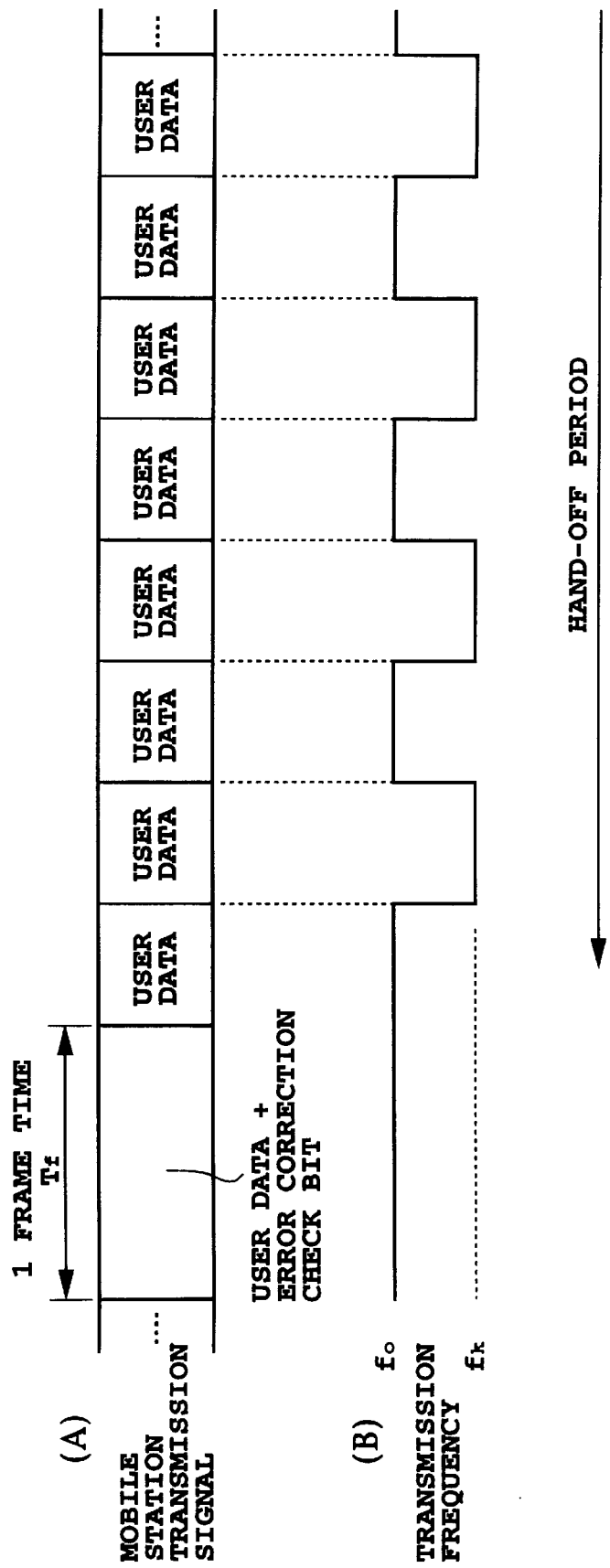
FIG. 8 is a timing chart showing operation of the mobile station during hand-off operation in the third embodiment.

Transmission timing from the mobile station when making hand-off is shown in FIG. 8. In the mobile station, the user data is primary modulated and secondary modulated to be transmitted. When making hand-off, during the hand-off period, error correction code is not produced, but only the user data is frequency changed over in the course of the frame and transmitted two times. The transmission signal is shown in FIG. 8(A). In this case, as shown in FIG. 8(B), the same user data is changed over in transmission frequency and transmitted to the communicating base station 502 and the new base station 503. The communicating base station 502 and the new base station 503 individually receive, demodulate, and make decision on the transmission data and transmit the detected data to the upper level station. A reproduction unit 510 of the upper level station 501 selects one of the two detected signals to reproduce a reliable user data. At this moment, one of higher reception level can be selected. Using this method, hand-off is possible without degradation of reception quality and without instantaneous interception. Alternatively, the demodulated signal from the communicating base station 502 and the demodulated signal from the new base station may be combined to make decision on the user data from the mobile station.

EMBODIMENT 4

Figure 9:
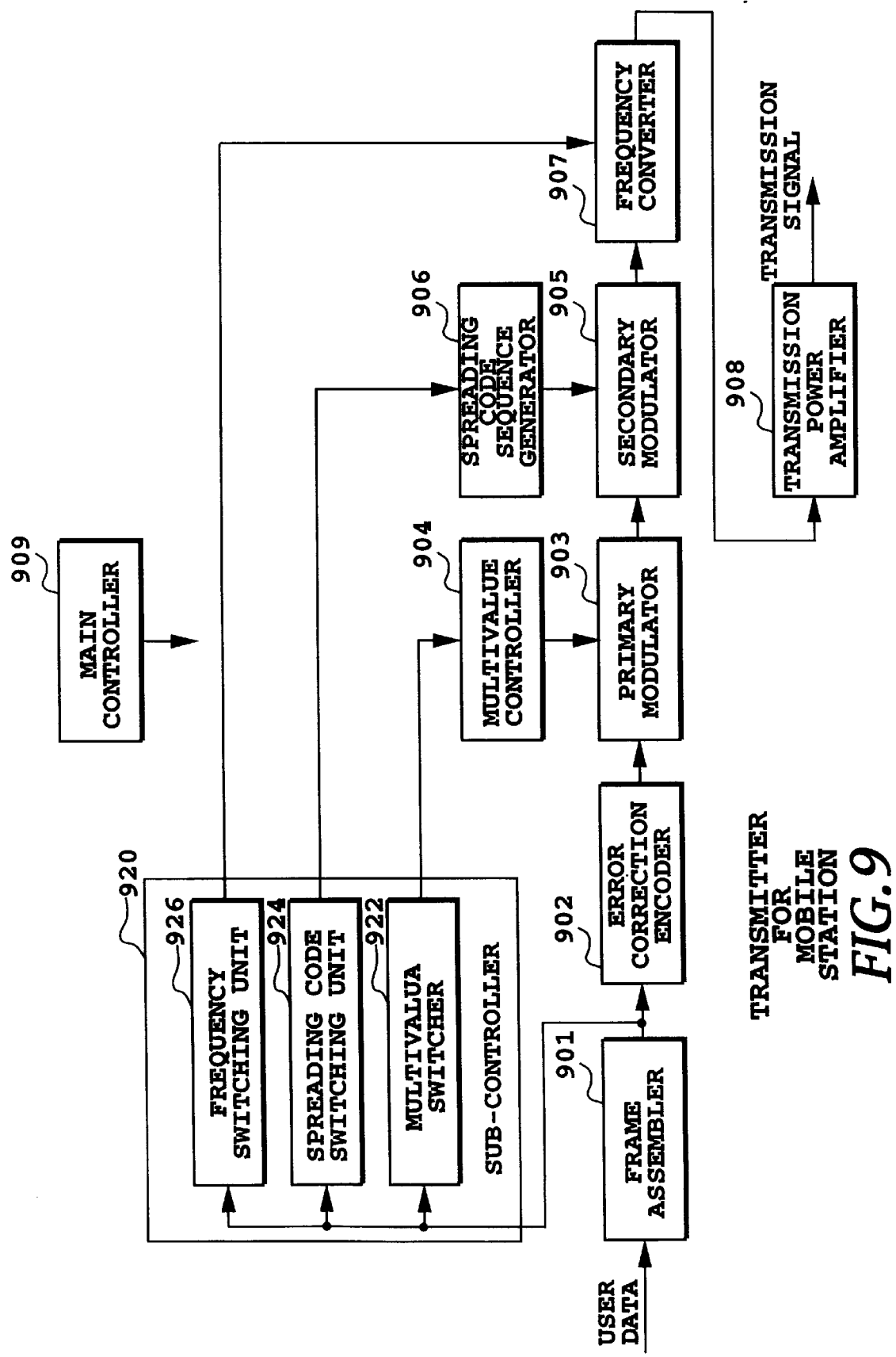
FIG. 9 is a block diagram showing a fourth embodiment of a transmitter of mobile station of the CDMA mobile communication system in accordance with the present invention.
Figure 10:
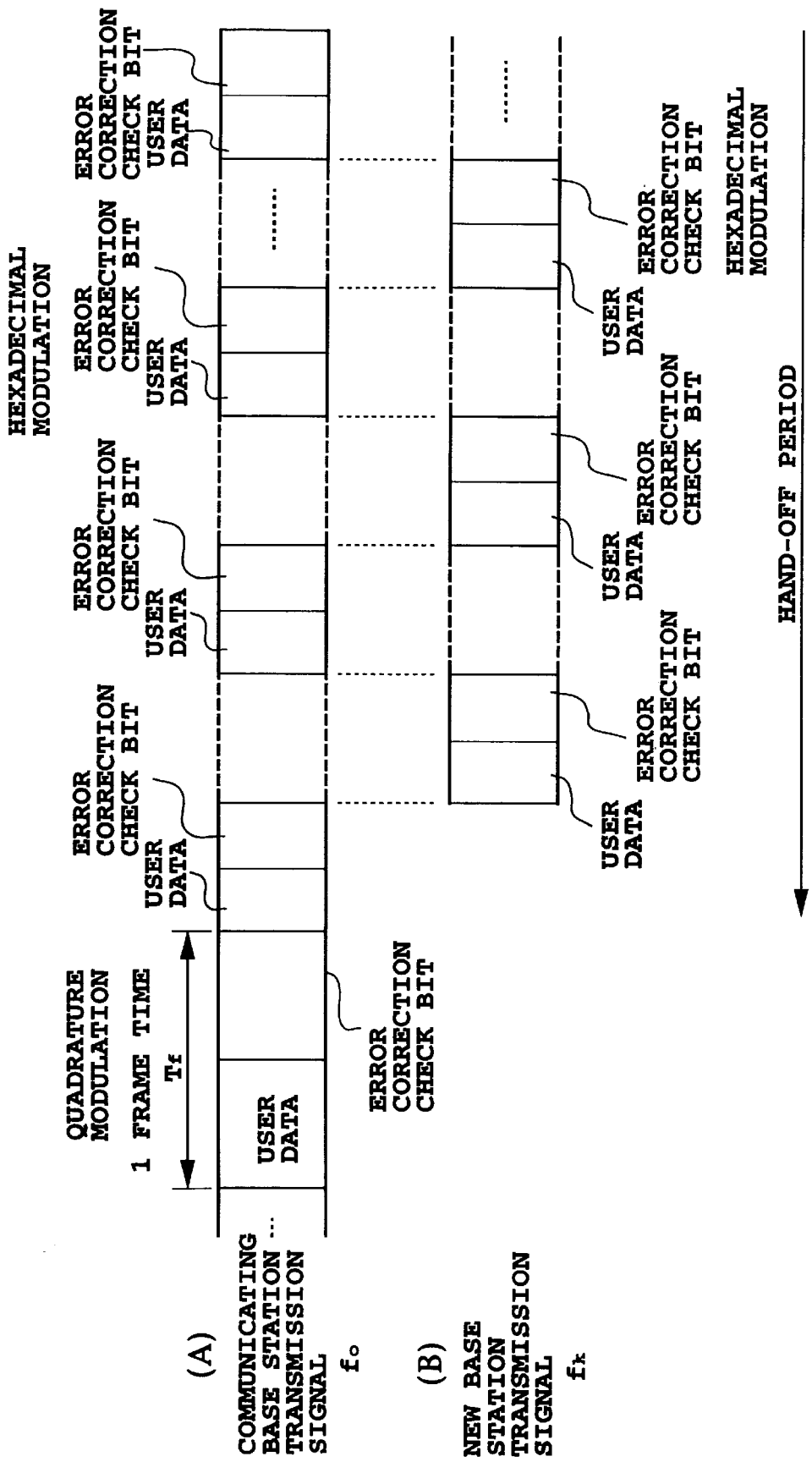
FIG. 10 is a timing chart showing operation of the base station during hand-off operation in the fourth embodiment.

Hand-off operation to change over the base station during communication using the same apparatus in making level monitoring described in FIGS. 3A, 3B, 4A and 4B will be described with reference to FIGS. 5, 9, and 10. FIG. 9 shows the construction of transmitter of a mobile station, and FIG. 10 shows hand-off timing.

FIG. 9 is a block diagram showing the construction of a transmission unit of the mobile station 504. In the figure, symbol 90X (X=1–9) corresponds to symbol 30X in FIG. 3A.

A difference of this transmission unit from the transmission unit of the base station as shown in FIG. 3A is that the former has a sub-controller 920. The sub-controller 920 comprises a modulated level switcher 922, a spreading code switching unit 924, and a frequency switching unit 926, and these units are supplied with control information from a frame forming unit 901. The modulation level switcher 922 sends a signal to a modulation level controller 904 to control the modulation level. That is, in normal mode, the user data and the error correction check bits are outputted in a period of 1 frame, whereas in hand-off mode, as shown in FIG. 10, the modulation level is controlled so that the user data and the error correction check bits are outputted in a period of ½ frame. According to this, the spreading code switching unit 924 sends a signal to a spreading code sequence generating unit 906 to change over the spreading code, and the frequency switching unit 926 sends a signal to a frequency converter 907 to change over the output frequency.

The transmission unit of the base station and the reception unit of the mobile station are similar in construction to the transmission unit and the reception unit shown in FIGS. 3A and 3B. Further, the reception unit of the base station is similar in construction to the reception unit of the mobile station as shown in FIG. 3B, with the frequency switching unit 362 and the spreading code switching unit 364 removed.

Hand-off in the present embodiment is carried out by changing the modulation of primary modulation. Both the communicating base station 502 and the new base station 503, during the hand-off period, under the control of the upper level station, as shown in FIG. 10, changes the modulation level of primary modulation to make a blank time. Here, unlike hand-off in the third embodiment, it is not necessary to remove the error correction code, and the user data and the error correction check bits are transmitted.

The mobile station 504 changes over the station to be received in the hand-off period. At the receiving side, the reception frequency is changed over in the course of 1 frame to achieve hand-off. Signals of the two changed-over base stations 502, 503 are received and demodulated, the demodulated signals are stored in a memory (not shown), read and combined. The combined signal, as a signal of 1 frame, is error correction decoded to reproduce the transmission data.

On the other hand, in hand-off of the transmitting side in the mobile station 504, the mobile station 504 modulates the transmission data using a changed modulation level, changes over the transmission frequency in the course of 1 frame, and transmits two times. The two base stations 502, 503 related to hand-off error correction decode the received signal to reproduce the transmission data to be transferred to the upper level station 501. The upper level station 501 selects either of the data received and reproduced by the communicating base station or the new station. At this time, for example, one of higher reception level may be selected.

EMBODIMENT 5

Figure 11:
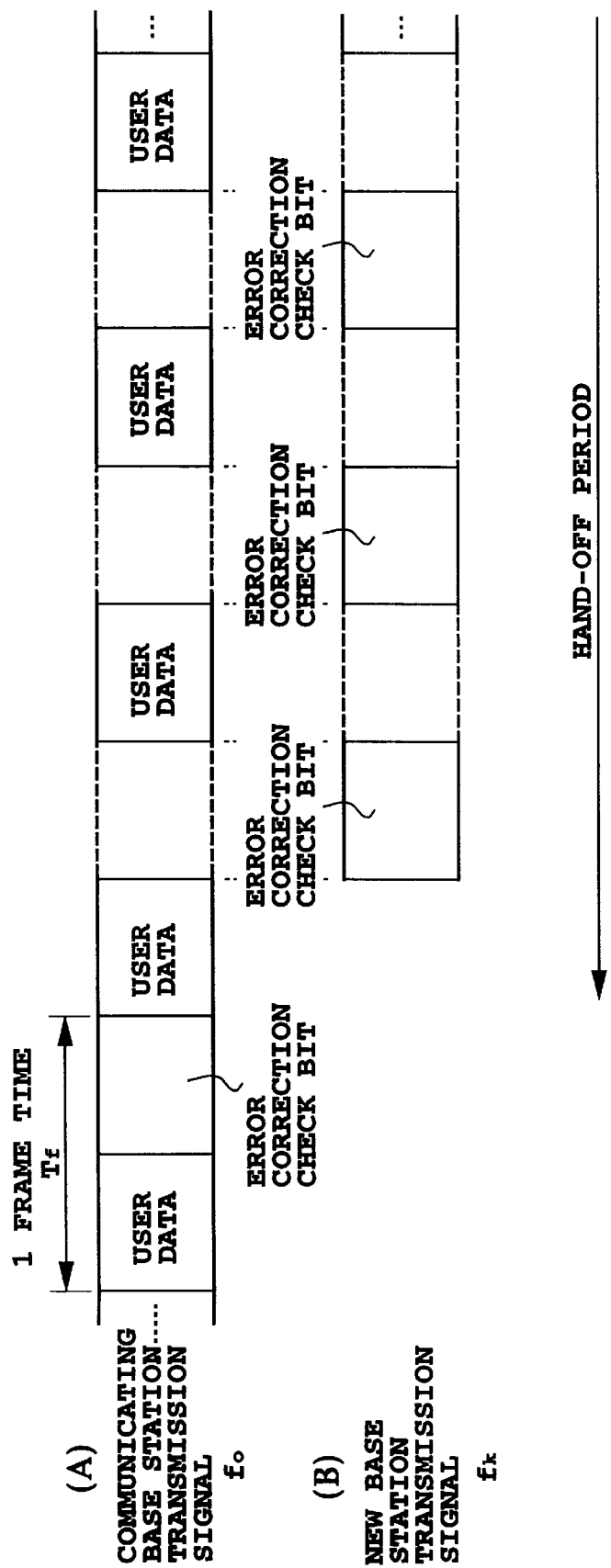
FIG. 11 is a timing chart showing operation of the base station during hand-off operation in a fifth embodiment of the CDMA mobile communication system in accordance with the present invention.

In the case of using measurement described in FIGS. 1A and 1B and FIG. 2, another system of hand-off for changing over the base station during communication using the same apparatus will be described with reference to FIGS. 5 and 11. FIG. 11 shows transmission timing at the base station when hand-off is carried out In this case, the transmitter of the base station and the receiver of the mobile station are similar to those shown in FIGS. 1A and 1B. Further, the transmitter of the mobile station and the receiver of the base station are also similar to those shown in FIGS. 1A and 1B.

The communicating base station 502, as shown in FIG. 11, does not produce error correction code under control of the upper level station 501 during the hand-off period, but modulates only the user data sequence portion for transmission. From the new base station 503, only the error correction check bits are modulated and transmitted.

The mobile station 504 changes over the reception frequency in the course of frame, and receives the user data from the communicating base station 502 and the error correction encoded check bits from the new base station 503. Then, the data from both base stations is stored in a memory, read to reproduce the original 1 frame data. Since the error correction check bits are received from the new base station 503, the reproduced 1 frame data can be error correction decoded, thereby reproducing more reliable transmission data.

EMBODIMENT 6

Figure 12:
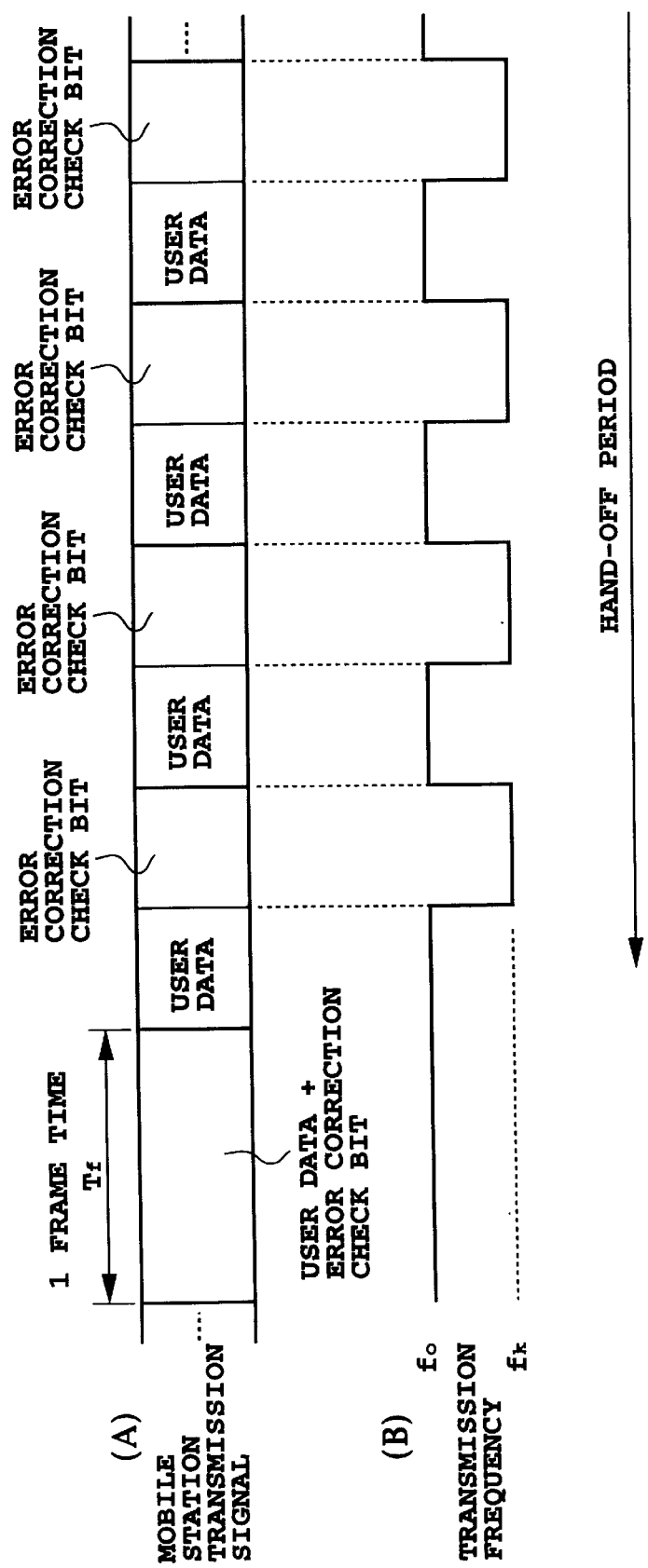
FIG. 12 is a timing chart showing operation of mobile station during hand-off operation in a sixth embodiment of the CDMA mobile communication system in accordance with the present invention.

In the case of using measurement described in FIGS. 1A and 1B and FIG. 2, a further system of hand-off for changing over the base station during communication using the same apparatus will be described with reference to FIGS. 5 and 12. FIG. 12 shows transmission timing at the mobile station when hand-off is carried out.

In this case, the transmitter of the base station and the receiver of the mobile station are similar to those shown in FIGS. 1A and 1B. Further, the transmitter of the mobile station and the receiver of the base station are also similar to the transmitter shown in FIG. 6 and the receiver shown in FIG. 1B.

The mobile station 504, as shown in FIG. 12, during the hand-off period, modulates the user data and the error correction check bits and transmits them in alternation. That is, in the first half of frame, the user data is transmitted at the reception frequency fo of the communicating base station 502, and in the second half of the frame, the error correction check bits are transmitted at the reception frequency fk of the new base station 503.

The communicating base station 502 receives the user data of the first half of the frame, and the new base station 503 receives the error correction coding check bits of the second half of the frame. The reproduction unit 510 of the upper level station 501 stores the data from both base stations, which is read to reproduce the original 1 frame data. In this case, the upper level station 501 receives the error correction coding check bits from the new base station 503, the reproduced 1 frame data can be error correction decoded, thereby reproducing more reliable transmission data.

What is claimed is:

1. A CDMA mobile communications method for making transmission by providing a mobile station, a first base station to be connected to said mobile station via the radio using a first frequency, a second base station to be connected to said the mobile station via the radio using a second frequency different from said first frequency, and an upper level station to be connected to said first and second base stations, said method comprising the steps of:

at each of said first and second base stations,
inputting user data to be transmitted to said mobile station, and error correction encoding said user data, thereby generating error correction check bits;
generating a narrow-band modulated signal by primary modulation of said user data and said error correction check bits;
generating a wideband signal by secondary modulation of said narrow band modulated signal using a spreading code; and
transmitting said wideband signal; and at said mobile station,
receiving said wideband signal;
restoring a narrow-band modulated signal by primary demodulation of said wideband signal using a spreading code identical to said spreading code;
restoring user data and error correction check bits by secondary demodulation of said narrow-band modulated signal;
reproducing user data by error correction decoding said user data and said error correction check bits, wherein at said mobile station, said wideband signal transmitted from said first base station is received at said first frequency in a first time in which said user data is to be transmitted, and said user data is reproduced; and
changing over a reception frequency to said second frequency to measure reception level of a signal transmitted from said second base station in a second time in which said error correction check bits is to be transmitted.

2. The CDMA mobile communication method as claimed in claim 1, wherein said mobile station has a function of making a hand-off operation in which communication is changed over from said first said base station to said second base station, and during the hand-off operation, said mobile station concurrently communicates with either of said first base station and said second base station, said first base station comprises a step for transmitting said user data in the first time and discontinuing the transmission in the second time,
said second base station comprises a step for transmitting said user data in the second time and discontinuing the transmission in the first time,
said mobile station comprises a step for receiving and demodulating a signal from said first base station in the first time, changing over the frequency of a receiver to the radio frequency of said second base station in the second time to receive and demodulate the signal from said second base station, and reproducing said user data by combining the signal from said first base station and the signal from said second base station.

3. The CDMA mobile communication method as claimed in claim 2, wherein, during the hand-off operation, said mobile station comprises a step for transmitting said user data to said first base station at a first radio frequency in a third time in which said user data is to be transmitted, and transmitting said user data to said second base station at a second radio frequency in a fourth time in which said error correction check bits are to be transmitted, said first base station comprises a step for demodulating said user data received in the third time,
said second base station comprises a step for demodulating said user data received in the fourth time, and
said upper level station of said first base station and said second base station comprises a step for reproducing said user data by combining these demodulated signals.

4. The CDMA mobile communication method as claimed in claim 1, wherein said mobile station has a function of making a hand-off operation in which communication is changed over from said first said base station to said second base station, and during the hand-off operation, said mobile station concurrently communicates with either of said first base station and said second base station, said first base station comprises a step for transmitting said user data in the first time and discontinuing the transmission in the second time;
said second base station comprises a step for transmitting said error correction check bits in the second time and discontinuing the transmission in the first time;
said mobile station comprises a step for receiving and demodulating a signal from said first base station in the first time, changing over the frequency of a receiver to the radio frequency of said second base station in the second time to receive and demodulate the signal from said second base station, and reproducing said user data by using said user data from said first base station and error correction check bits from said second base station.

5. The CDMA mobile communication method as claimed in claim 4, wherein, during the hand-off operation, said mobile station comprises a step for transmitting said user data at the first radio frequency to said first base station in the third time in which said user data is to be transmitted, and transmitting said error correction check bits at the second radio frequency to said second base station in the fourth time in which said error correction check bits are to be transmitted;
said first base station comprises a step for demodulating said user data received in the third time;
said second base station comprises a step for demodulating said error correction check bits received in the fourth time; and
an upper level station of said first base station and said second base station comprises a step for reproducing said user data by error correction decoding using these demodulated signals.

6. A CDMA mobile communication method for making transmission by providing a mobile station, a first base station to be connected to said mobile station via the radio using a first frequency, and a second base station to be connected to said mobile station via the radio using a second frequency different from said first frequency, said method comprising the steps of:

at each of said first and second base stations,
inputting user data to be transmitted to said mobile station, and error correction encoding the said user data, thereby generating error correction check bits;
generating a narrow-band modulated signal by multilevel modulation of said user data and said error correction check bits;
generating a wideband signal by spreading modulation of said narrow-band modulated signal using a spreading code; and
transmitting said wideband signal; and at said mobile station,
  receiving said wideband signal;
  restoring a narrow-band modulated signal by spreading demodulation of said wideband signal using a spreading code identical to said spreading code;
  restoring user data and error correction check bits by multilevel demodulation of said narrow-band modulated signal; and
  error correction decoding said user data and said error correction check bits, thereby reproducing user data:
  wherein at said mobile station, a multilevel of said multilevel modulation is increased, and said user data and said error correction check bits are transmitted in a first time which is shorter than a total time length corresponding to a sum of the signal time length of said user data and a signal time length of said error correction check bits, while transmission is discontinued in a second time which is within a time length obtained by subtracting said first time from said total time length; and
  wherein at said mobile station, the multilevel of said multilevel modulation is increased in the first time, and thereafter, said user data and said error correction check bits are received to reproduce said user data, while a reception frequency is changed over to said second frequency in the second time to measure reception level of a signal transmitted from said second base station.

7. The CDMA mobile communication method as claimed in claim 6, wherein said mobile station has a function of making a hand-off operation in which communication is changed over from said first said base station to said second base station, and during the hand-off operation period, said mobile station concurrently communicates with either of said first base station and said second base station,
  said first base station comprises a step for transmitting said user data an its error correction check bits in the first time;
  said second base station comprises a step for transmitting said user data and its error correction check bits in the second time;
  said mobile station comprises a step for receiving said user data and said error correction check bits from said first base station in the first time, changing over the reception frequency to the radio frequency of said second base station to receive said user data and said error correction check bits in the second time, and reproducing said user data by combining the signal from the said first base station and the signal from said second base station and by performing error correction.

8. A CDMA mobile communication system comprising a mobile station, a first base station to be connected to said mobile station via the radio using a first frequency, and a second base station, a first base station to be connected to said mobile station via the radio using a second frequency different from said first frequency, wherein each of said first and second base stations comprise:
  means for inputting user data to be transmitted to said mobile station, and error correction encoding said user data, thereby generating error correction check bits;
  means for generating narrow-band modulated signal by primary modulation of said user data and said error correction check bits; and
  means for generating a wideband signal by secondary modulation of said narrow-band modulated signal using a spreading code, and transmitting said wideband signal; and wherein said mobile station comprises:
  first means for receiving said wideband signal, and restoring a narrow-band modulated signal by primary demodulation of said wideband signal using a spreading code identical to said spreading code;
  second means for restoring user data and error correction check bits by secondary demodulation of said narrow-band modulated signal; and
  third means for error correction decoding said user data and said error correction check bits to reproduce user data;
  wherein said first means of said mobile station sets reception frequency at said first frequency to receive said wideband signal transmitted from said first base station in a first time in which said user data is to be transmitted, and said first means changes over the reception frequency to said second frequency to receive a signal transmitted from said second base station in a second time in which said error correction check bits are to be transmitted; and
  said mobile station comprises:
    means for measuring reception level of the signal transmitted from said second base station in the second time.

9. The CDMA mobile communication system as claimed in claim 8 further comprising an upper level station for instructing hand-off between said first base station and said second base station, wherein
  said first data station comprises first control means for transmitting said user data in the first time and discontinuing the transmission in the second time according to the hand-off instruction from said upper level station;
  said second data station comprises second control means for transmitting said user data in the second time and discontinuing the transmission in the first time according to the hand-off instruction; and
  said mobile station comprises receiving frequency switching means for changing the frequency of a receiver between the transmission frequency of said first base station and the transmission frequency of said second base station, and a demodulator for receiving and demodulating the signal from said first base station in the first time and receiving and demodulating the signal from said second base station in the second time for combining the signal from said first base station and the signal from said second base station to reproduce said user data.

10. The CDMA mobile communication system as claimed in claim 9, wherein the mobile station comprises transmission frequency change-over means for changing over the transmission frequency of a transmitter between the reception frequency of said first base station and the reception frequency of said second base station, and transmission means for, during the hand-off period, transmitting user data at the reception frequency of said first base station in the third time in which said user data is to be transmitted and transmitting said user data at the reception frequency of said second base station in the fourth time in which said error correction check bits are to be transmitted;
  said first base station comprises a first demodulator for demodulating said user data received in the third time;
  said second base station comprises a second demodulator for demodulating said user data received in the fourth time; and
  said upper level station comprises means for reproducing said user data by combining the demodulated signals demodulated by said individual demodulator.

11. The CDMA mobile communication system as claimed in claim 8 further comprising an upper level station for instructing hand-off between said first base station and said second base station, wherein said first base station comprises first control means for transmitting said user data in the first time and discontinuing the transmission in the second time according to the hand-off instruction from said upper level station;

said second base station comprises second control means for transmitting said error correction check bits in the second time and discontinuing the transmission in the first time according to the hand-off instruction;

said mobile station comprises receiving frequency switching means for changing the frequency of the receiver between the transmission frequency of said first base station and the transmission frequency of said second base station, and a demodulator for receiving and demodulating the signal from said first base station in the first time and receiving and demodulating the signal from said second base station in the second time to reproduce said user data using said user data from said first base station and said error correction check bits from said second base station.

12. The CDMA mobile communication system as claimed in claim 11, wherein the mobile station comprises transmission frequency change-over means for changing over the transmission frequency of a transmitter between the reception frequency of said first base station and the reception frequency of said second base station, and transmission means for, during the hand-off period, transmitting user data at the reception frequency of said first base station in the third time in which said user data is to be transmitted and transmitting said error correction check bits at the reception frequency of said second base station in the fourth time in which said error correction check bits are to be transmitted;

said first base station comprises a demodulator for demodulating said user data received in the third time;

said second base station comprises a demodulator for demodulating said error correction check bits received in the fourth time; and said upper level station comprises means for making error correction decoding using the demodulated signals outputted from said individual demodulator to reproduce said user data.

13. A CDMA mobile communication system comprising a mobile station, a first base station to be connected to said mobile station via the radio using a first frequency, and a second base station to be connected to said mobile station via the radio using a second frequency different from said first frequency, wherein each of said first and second base stations comprises:

means for inputting user data to be transmitted to said mobile station, and error correction encoding said user data, thereby generating error correction check bits;

means for generating a narrow-band modulated signal by multilevel modulation of said user data and said error correction check bits; and means for generating a wideband signal by spreading modulation of said narrow-band modulated signal using a spreading code, and transmitting said wideband signal; and said mobile station comprises:

first means for receiving said wideband signal, and restoring a narrow-band modulated signal by spreading demodulation of said wideband signal using a spreading code identical to said spreading code;

second means for restoring user data and error correction check bits by multilevel demodulation of said narrow-band modulated signal; and third means for reproducing user data by error correction decoding said user data and said error correction check bits; and wherein said first base station comprises a first modulation level control unit for varying the modulation level of said multilevel modulation of said user data and said error correction check bits, and means for making a second time for discontinuing transmission by transmitting with an increased modulation level in the first time during a reception level monitoring period for said mobile station to monitor the reception level of the signal from a second base station differing in frequency from said first base station; and said mobile station comprises receiving frequency switching means for tuning the frequency of a receiver between the transmission frequency of said first base station and the transmission frequency of said second base station, a second modulating level control unit for changing the modulation level of said multilevel modulation, and a demodulator for demodulating the reception signal with an increased modulation level and making error correction decoding to reproduce said user data, and a received level measuring unit for changing over the reception frequency to the transmission frequency of said second base station to monitor the reception level of said second base station.

14. The CDMA mobile communication system as claimed in claim 13, further comprising an upper level station for instructing hand-off between said first base station and said second base station, wherein said first base station comprises first transmission means for transmitting said user data and its error correction check bits in the first time according to the hand-off instruction from said upper level station;

said second base station comprises second transmission means for transmitting said user data and its error correction check bits in the second time according to the hand-off instruction; and said mobile station comprises means for receiving said user data and said error correction check bits from said first base station in the first time, changing over the reception frequency to the transmission frequency of said second base station in the second time to receive said user data and said error correction check bits, and combining the signal from said first base station and the signal from said second base station to reproduce said user data.

15. A CDMA mobile communication system comprising a mobile station, a first base station to be connected to said mobile station via the radio using a first frequency, and a second base station to be connected to said mobile station via the radio using a second frequency different from said first frequency wherein each of said first and second base stations comprises:

means for inputting user data to be transmitted to said mobile station, and error correction encoding said user data thereby generating error correction check bits;

means for generating a narrow-band modulated signal by primary modulation of said user data and said error correction check bits; and means for generating a wideband signal by secondary modulation of said narrow-band modulated signal using a spreading code, and transmitting said wideband signal; and said mobile station comprising a first base station which, after a user data is error correction encoded, transmits a narrow-band modulated signal obtained by primary modulation of said user data and an error correction check bits, followed by secondary modulation by a spreading code to a wideband signal, and a mobile station for making conversion of said wideband signal to said narrow-band modulated signal, followed by demodulation and error correction decoding, to reproduce said user data; wherein a receiver of said mobile station comprises:

a demodulator for demodulating said user data in a first time of receiving said user data transmitted from said first base station;

an error correction decoder which discontinues said error correction decoding in the second time of receiving said error correction check bits and outputs said user data which is not error correction decoded;

a frequency switching unit for changing over the reception frequency to a radio frequency of a second base station differing in used frequency from said first base station in the second time; and a received level measuring unit for monitoring the reception level of said second base station.

16. The mobile station as claimed in claim 15, wherein said receiver of said mobile station comprising:

a reception frequency switching unit for changing the reception frequency of said receiver between the transmission frequency of said first base station and the transmission frequency of said second base station, and a demodulator which, during the hand-off period between said first base station and said second base station, receives and demodulates the signal from said first base station in the first time, receives and demodulates the signal from said second base station in the second time for combining the signal from said first base station and the signal from said second base station to reproduce said user data;

and said transmitter of said mobile station comprises:

transmission frequency change-over means for changing the transmission frequency between the reception frequency of said first base station and the reception frequency of said second base station; and transmission means for, during the hand-off period, transmitting user data at the reception frequency of said first base station in the third time in which said user data is to be transmitted and transmitting said user data at the reception frequency of said second base station in the fourth time in which said error correction check bits are to be transmitted; and wherein said first base station comprises a step for demodulating said user data received in the third time;

the second base station comprises a step for demodulating said user data received in the fourth time; and a upper level station of said first base station and said second base station comprises a step for combining these demodulated signals to reproduce said user data.

17. A CDMA mobile communication system comprising a mobile station, a first base station to be connected to said mobile station via the radio using a first frequency, and a second base station to be connected to said mobile station via the radio using a second frequency different from said first frequency wherein each of said first and second base stations comprises:

means for inputting user data to be transmitted to said mobile station, and error correction encoding said user data thereby generating error correction check bits;

means for generating a narrow-band modulated signal by multilevel modulation of said user data and said error correction check bits; and means for generating a wideband signal by spreading modulation of said narrow-band modulated signal using a spreading code, and transmitting said wideband signal; and said mobile station comprises a first base station which, after a user data is error correction encoded, transmits a narrow-band modulated signal obtained by primary modulation with multilevel modulation of said user data and an error correction check bits, followed by secondary modulation by a spreading code to a wideband signal, and said mobile station making conversion of said wideband signal to said narrow-band modulated signal, followed by demodulation and error correction decoding, the reproduce said user data, said first base station transmitting said user data and said error correction check bits in a first time with an increased multiple value of said multilevel modulation to make a second time for discontinuing transmission, wherein a receiver of said mobile station comprises:

a modulated level switcher for increasing the modulation level of said multilevel modulation in the first time during reception level monitoring period for monitoring the reception level of the signal from a second base station differing from said first base station;

a reception frequency switching unit for changing the reception frequency of said receiver between the transmission frequency of said first base station and the transmission frequency of a second base station; and a received level measuring unit for monitoring the reception level of said second base station in the second time.

18. The mobile station as claimed in claim 17, wherein said reception frequency switching unit of said receiver of said mobile station, during a hand-off period between said first base station and said second base station, changes over the reception frequency to the transmission frequency of said first base station in the first time, and to the transmission frequency of said second base station in the second time, and said means for combining the signal from said first base station and the signal from said second base station to reproduce said user data.

* * * * *